United States Patent
Dellow et al.

(10) Patent No.: US 7,783,894 B2
(45) Date of Patent: Aug. 24, 2010

(54) MONOLITHIC SEMICONDUCTOR INTEGRATED CIRCUIT AND METHOD FOR SELECTIVE MEMORY ENCRYPTION AND DECRYPTION

(75) Inventors: Andrew Dellow, Gloucester (GB); Howard Gurney, Bristol (GB)

(73) Assignee: STMicroelectronics Limited, Bristol (GB)

( * ) Notice: Subject to any disclaimer, the term of this patent is extended or adjusted under 35 U.S.C. 154(b) by 579 days.

(21) Appl. No.: 10/583,577

(22) PCT Filed: Dec. 17, 2004

(86) PCT No.: PCT/GB2004/005327

§ 371 (c)(1),
(2), (4) Date: Jul. 2, 2007

(87) PCT Pub. No.: WO2005/059725

PCT Pub. Date: Jun. 30, 2005

(65) Prior Publication Data

US 2007/0280475 A1    Dec. 6, 2007

(30) Foreign Application Priority Data

Dec. 19, 2003    (EP) ................................. 03258079

(51) Int. Cl.
*H04L 29/06*    (2006.01)
*H04L 9/32*    (2006.01)
*G06F 11/30*    (2006.01)
*G06F 12/14*    (2006.01)
*G06F 17/00*    (2006.01)
*G06F 11/00*    (2006.01)
*G06F 12/16*    (2006.01)
*G08B 23/00*    (2006.01)
*H04N 7/16*    (2006.01)

(52) U.S. Cl. ........................ 713/189; 713/160; 713/168; 713/170; 713/171; 713/193; 726/1; 726/22; 726/26

(58) Field of Classification Search ................ 713/189, 713/160, 168, 170, 193, 171; 726/1, 22, 726/26
See application file for complete search history.

(56) References Cited

U.S. PATENT DOCUMENTS 5,081,675 A    1/1992    Kittirutsunetorn (Continued)

FOREIGN PATENT DOCUMENTS

EP    0660215 A2    6/1995

(Continued)

*Primary Examiner*—Shin-Hon Chen
(74) *Attorney, Agent, or Firm*—Lisa K. Jorgenson; Timothy L. Boller; Seed IP Law Group PLLC

(57) ABSTRACT

A monolithic semiconductor integrated circuit is provided for selectively encrypting or decrypting data transmitted between one of a plurality of devices on the circuit and an external memory. Two series of data pathways connect the devices and the external memory. The first series of data pathways passes through a cryptographic circuit causing data to be encrypted or decrypted, and the other series of data pathways provides an unhindered route. When a data access request is made by a device, the data is selectively routed along one of the two series of data pathways according to the identification of the device making the data access request. In one example, if data is transmitted from a device to the external memory, the data is selectively encrypted before being stored in the external memory if the device transmitting the data is identified as secure. Then, when that data is retrieved from the external memory by a second device, the data is selectively decrypted only if the second device is identified as secure.

36 Claims, 2 Drawing Sheets

U.S. PATENT DOCUMENTS

| | | | |
|---|---|---|---|
| 6,968,454 B2 * | 11/2005 | Master et al. | 713/168 |
| 7,010,681 B1 * | 3/2006 | Fletcher et al. | 713/154 |
| 7,216,230 B2 * | 5/2007 | Suzuki et al. | 713/170 |
| 7,219,223 B1 * | 5/2007 | Bacchus et al. | 713/150 |
| 7,242,766 B1 * | 7/2007 | Lyle | 380/2 |
| 2003/0172167 A1 * | 9/2003 | Judge et al. | 709/229 |
| 2004/0083361 A1 * | 4/2004 | Noble et al. | 713/160 |

FOREIGN PATENT DOCUMENTS

| | | |
|---|---|---|
| EP | 0720098 B1 | 7/1996 |
| EP | 1172731 B1 | 1/2002 |

\* cited by examiner

MONOLITHIC SEMICONDUCTOR INTEGRATED CIRCUIT AND METHOD FOR SELECTIVE MEMORY ENCRYPTION AND DECRYPTION

FIELD OF THE INVENTION

This invention relates to selective encryption and decryption of data in secure systems, including, but not limited to, pay-television systems.

BACKGROUND OF THE INVENTION

In secure systems, data often needs to be encrypted to prevent unauthorised access to it, and then decrypted when needed. For example, in pay-television systems, data encryption prevents hackers from gaining access to broadcast services without making the appropriate payment to the service provider. However, not all data within the system may be of a confidential nature. Confidential data may be referred to as being privileged, and the term privilege is known to those skilled in the art as meaning rights of access. Some prior systems indiscriminately encrypt all data, regardless of the privilege status of the data, or whether the devices handling the data are secure. A secure device is one which has a low susceptibility to hacking, and therefore has a low probability of containing illegitimate data. This approach is inefficient and increases processing overhead. One particular problem in the field of pay-television systems is that privileged data from a first secure device may need to be temporarily stored in an insecure external memory before being written into a second secure device. The data may be vulnerable to hacking while being stored in the external memory.

We have appreciated that only privileged data needs to be encrypted. We have further appreciated that a means to identify privileged data is required so that data may be selectively encrypted and decrypted.

SUMMARY OF THE INVENTION

The invention is defined in the independent claims, to which reference may now be directed. Advantageous features are set out in the dependant claims.

In one embodiment, a monolithic semiconductor integrated circuit is provided for selectively encrypting or decrypting data transmitted between one of a plurality of devices on the circuit and an external memory. Two series of data pathways connect the devices and the external memory. The first series of data pathways passes through a cryptographic circuit causing data to be encrypted or decrypted, and the other series of data pathways provides an unhindered route. When a data access request is made by a device, the data is selectively routed along one of the two series of data pathways according to the identification of the device making the data access request. In one example, if data is transmitted from a device to the external memory, the data is selectively encrypted before being stored in the external memory if the device transmitting the data is identified as secure. Then, when that data is retrieved from the external memory by a second device, the data is selectively decrypted only if the second device is identified as secure.

DESCRIPTION OF PREFERRED EMBODIMENTS

Figure 1:
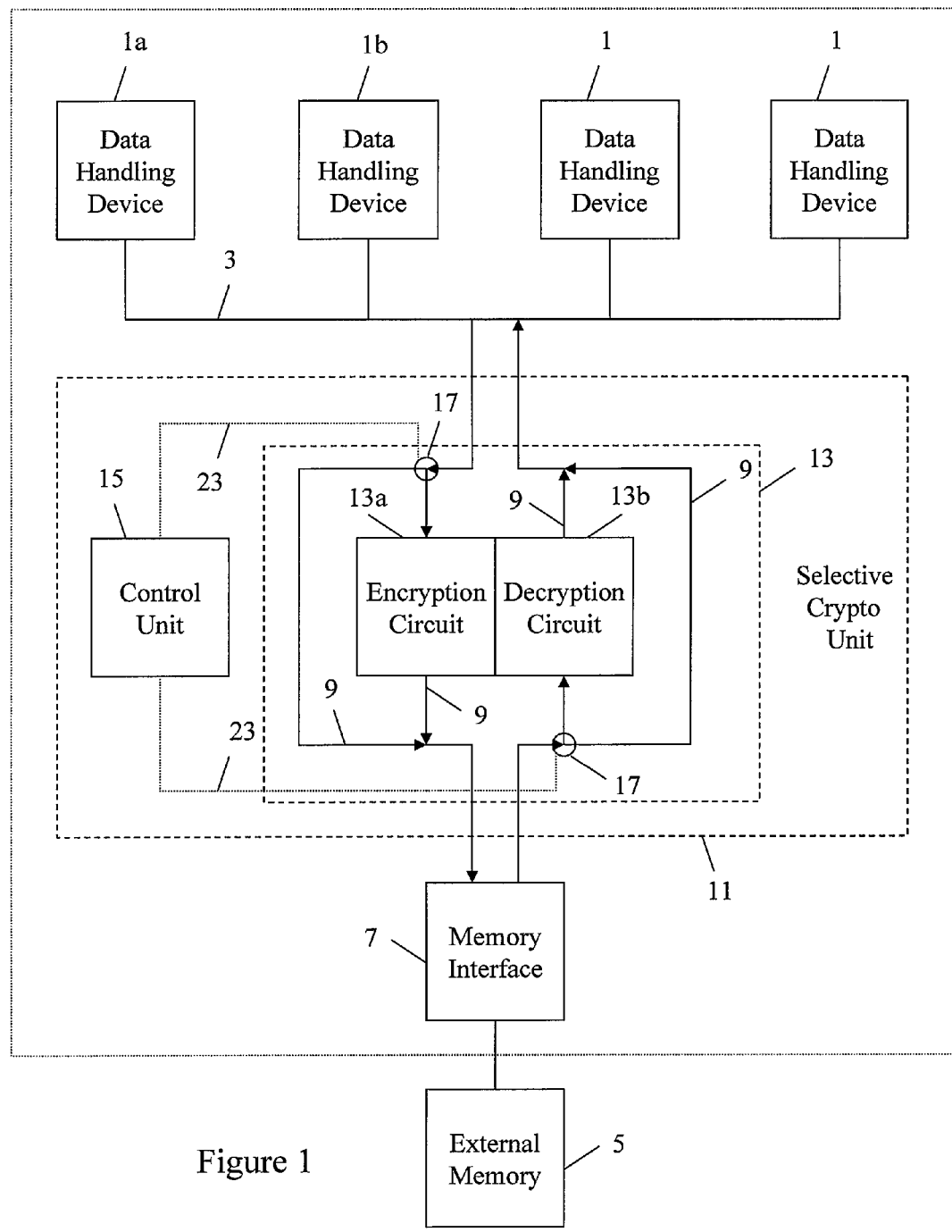
FIG. 1 is a schematic diagram of a system embodying the invention.

A system embodying the invention comprises a plurality of data sources and destinations in the form of data handling devices 1, hereinafter referred to simply as devices. As used herein, the term device may include any data source or destination associated with more than one actual device, or may include an interface to such a data source or destination. For example, the term device includes a data source or destination such as a network comprising a plurality of inter-connected devices, possible widely distributed from each other. The term device also includes devices which may communicate in a wireless manner. The devices 1 may include for example, a crypto core, direct memory access (DMA) unit, central processing unit (CPU), moving picture experts group (MPEG) decoder, read only memory (ROM), transport interface (TI), a universal serial bus (USB) interface, or a broadcast receiver. The devices 1 may handle a variety of data such as video, audio and other multimedia data, or system data including encryption keys. Data may be generated internally by the system, or may be received from external sources, such as data broadcast over air from a broadcast service provider. A device 1 may provide data, utilise data, store data, process data, or any combination of these. In particular, each device 1 may also request data accesses from an external memory 5. The devices 1 are connected to, and interface with other parts of the system via a data bus and data bus interface 3. The external memory 5 is connected to a memory interface (MI) 7 which provides an interface between the external memory 5 and other parts of the system.

The MI 7 and bus interface 3 are inter-connected by a plurality of data pathways 9 forming a plurality of data routes so that data may be transmitted between the external memory 5 and devices 1 along a route. A data pathway corresponds to a distinct, possibly fragmentary passage along which data may flow. For example, in one embodiment a data pathway may comprise a particular portion of conductive track on a circuit. A data route is formed from a contiguous sequence of connected pathways, and provides a route for data to pass between components of the system. A data route is defined by those pathways from which it is formed, and the order in which data flows along those pathways. It can be seen that a single pathway may form part of two distinct data routes, the routes being distinguishable, for example, by those pathways not shared by both routes.

When a data access is requested, the device 1 making the request transmits data access commands to the MI 7. The MI 7 receives the commands and transmits data access signals to the external memory 5 in response to the command. The data access signals cause specified data to be retrieved from the external memory 5 according to the command. The retrieved data is then transmitted via a data route to the device 1 which made the request. The data access signals may comprise for example an identification of the amount of data to be retrieved, and the start memory address of the data block.

It can be seen that data may flow between the external memory 5 and devices 1 via the memory interface 7 and bus interface 3 respectively. Some of the data within the system may be confidential or privileged and require protection from unauthorised access. Conversely, some of the data may not be privileged and not require protection. An advantage of the present invention is that only that data which are privileged and require protection is encrypted, resulting in improved efficiency and lower processing overhead.

In order to maintain the security of the system, data which is confidential, herein referred to as privileged data, is stored in an encrypted form when the device storing the data is insecure. An insecure device such as an external memory is a device that is vulnerable to hacking, and the contents of which should not be assumed to be safe from unauthorised access. The encryption process renders the data incomprehensible unless the correct key to decrypt the data is known. It is important that as data is transferred between devices, data transferred to an insecure device is in an encrypted form before being stored. An external memory is always considered an insecure device. It is the status of the data source that determines whether the data should be encrypted or not.

Data may be defined as privileged if the provider of the data is identified as secure. Alternatively, data may be defined as privileged if the device 1 requesting the data is defined as secure. It is understood that data may be defined as privileged according to a combination of conditions including that described above, and others.

Data is selectively encrypted or decrypted according to the privilege status of the data. For example, since the external memory 5 is an insecure device, and therefore stores privileged data in an encrypted form, data accessed from the external memory 5 is selectively decrypted according to the identity of the device 1 which requested the data access. In this way, data access requests originating from insecure sources do not cause the data to be decrypted, so that when the data is stored in the requesting device, it cannot be accessed by hackers since it remains in an encrypted form. However, data access requests originating from secure devices cause the data to be decrypted since the data may be stored in an unencrypted form in secure devices. If data is transmitted from a device 1 to the external memory 5, the data is selectively encrypted if the device is secure since the data will be stored in the device in an unencrypted form, but the data would need to be stored in the external memory 5 in an encrypted form. If data is transmitted from an insecure device to the external memory 5, then the data is transmitted unaltered in an encrypted form.

To achieve selective encryption or decryption of data transmitted between the external memory 5 and devices 1, the data routes pass through a selective cryptographic unit 11. The selective cryptographic unit 11 comprises a cryptographic circuit 13 for encrypting and decrypting data, a control unit 15 for controlling the selective encryption or decryption of data, and a plurality of alternative selectable data routes. The cryptographic circuit 13 may be, for example, a circuit arranged to execute the advanced encryption standard (AES) algorithm, and may comprise separate encryption 13a and decryption 13b circuits as shown in FIG. 1. A first series of data routes formed from pathways 9 which do not pass through the cryptographic circuit 13 provide an uninhibited route for data transmission through the selective cryptographic unit 11. A second series of data routes are formed from data pathways 9 which do pass through the cryptographic circuit 13, which encrypts or decrypts any data flowing along those routes. The data pathways 9 are selectable so that data may be selectively directed along one of the two series of routes. In this way it can be seen that data may be selectively encrypted, decrypted, or not depending upon which series of data routes the data flows along. In the preferred embodiment, only a single pathway 9 passes through each of the encryption and decryption portions of the cryptographic circuit 13. In this case, all the data routes that pass through the cryptographic circuit 13 include one of these pathways.

The data routes are selected according to the switching state of one or more routing components 17, such as multiplexors (MUX) or switches, which inter-connect the data pathways 9. In one embodiment, a switch 17 receives as an input data retrieved from the external memory 5, and selectively routes the data, according to the switching state of the switch 17, through one of two outputs. One of the outputs is connected to a pathway forming one of the series of data routes, and the other output is connected to a pathway forming the other series of data routes. The switching state of the switch 17 is controllable by signals generated by the control unit 15 and transmitted to the switch via a communication link 23. The control signals set the state of each routing component 17, and thus select the routing of data along a selected one of the series of data routes.

In order to determine which of the devices 1 are secure, each one of the devices 1 is associated with at least one unique device identification. For example, a device identification may be a predetermined code in the form of a number which is stored within the associated device. The identification may be stored in a hardware based, or non volatile memory to prevent unauthorised modification of the identifier. When a data access is requested by one of the devices 1, the source identification corresponding to that device is retrieved and transmitted to the control unit 15. The control unit 15 comprises a means to determine from the received source identification whether the associated device 1 is secure. For example, in one embodiment, the control unit 15 may use the device identification as an index to a look-up table containing a record of which devices 1 are secure and which are insecure. The table may be modified only by a secure source to prevent unauthorised modification of the table. In an alternative embodiment, the control unit 15 may comprise a hardware based pathway selection circuit where the selection of data routes is performed according to a number of predetermined hard-wired rules.

Each device 1 may be associated with only a single device identification. However, if a device comprises several independent parts, some of which are secure and others which are not, then each part of the device 1 may be associated with a distinct identification. In this way, a distinction is made not between secure and insecure devices, but between secure and insecure parts of the system, regardless of whether they belong to the same or different devices.

When the control unit 15 has determined whether or not the device 1 requesting the data access is secure, a control signal is generated to set the switching states of the routing components 17 to select the appropriate data pathway 9 for the data to be transmitted along. For example, in the case of data being transferred from the external memory 5 to a device 1, if the control unit 15 determines that the device 1 requesting the data is secure, a control signal is generated such that the routing component 17 routes the data through the cryptographic circuit 13 so that the data is decrypted. If the control unit 15 determines that the device 1 requesting the data is not secure, a control signal is generated such that the routing component 17 routes the data through a direct route so that the data is not decrypted.

An advantage of the present invention is that even devices 1 which are not secure may be allowed to perform certain data operations. For example, an insecure device such as a DMA unit may be allowed to retrieve and move data around the system. Since the device is insecure, the data it handles will remain in an encrypted form, and even though the device may be able to transfer data, it would be unable to view the data.

To further increase the security and integrity of the system, the selective cryptographic unit 11, MI 7, control unit 15, bus interface 3, and devices 1 are all contained on a single monolithic semiconductor integrated circuit. This ensures that data cannot easily be intercepted from within the system and components cannot easily be substituted with illegitimate replacements to attempt to circumvent security.

It is clear to the skilled person that the invention is also applicable to transmission of data between any devices within the system. In one embodiment, separate data routes may be provided for read and write operations, or for transmission of data between particular sources and destinations.

An implementation of the invention shall now be described to illustrate an operation of the invention in the context of a pay-television system. In this implementation, data may be transferred from a first device 1a to a second device 1b via the external memory 5. For example, the first device 1a may provide data to the system, which is stored in the external memory 5, and later accessed by the second device 1b. In this process, the first device 1a may be referred to as a provider, and the second device 1b may be referred to as a consumer. A secure device is resistant to hacking and may safely contain privileged data in an unencrypted form. An insecure device, however, should only contain privileged data in an encrypted form so that if the device is infiltrated, the data remains confidential. It is important, therefore, that at every stage, privileged data is not transferred in an unencrypted form from a secure device to an insecure device.

Requested data is retrieved from the first device 1a, then transferred and written to the external memory 5. It is important that privileged data is in an encrypted form while it is stored in the external memory 5 because the external memory 5 is insecure and vulnerable to hacking. Accordingly, if the first device 1a is identified as secure then the data is selectively encrypted before being written to the external memory 5. Next, if the second requesting device 1b is identified as secure, then the data is selectively decrypted before being transferred to the device 1b. However, if the second device 1b is identified as insecure, then the data is passed directly from the external memory 5 to the device 1b without being decrypted. In this way, a secure provider of data cannot pass information to an insecure consumer of data as the information would be stored in the external memory 5 in an encrypted form, but not decrypted when it is passed back to the consumer.

In one particular example, one of the data handling devices 1 is a broadcast receiver, which receives data broadcast over air, for example from a service provider. The content of the received broadcast data may be in the form of television data, encryption keys, or other privileged data which is broadcast in an encrypted form to prevent unauthorised access to it. Since a broadcast may be intercepted, the broadcast may be thought of as being insecure. To provide the data to various parts of the system, the data is first written to the external memory 5 where it then becomes available. In this case, since the data is already in an encrypted form, and the broadcast is insecure, the data is transmitted from the receiver to the external memory 5 along a selected data route that does not pass through the cryptographic circuit 13. The external memory 5 then contains encrypted broadcast data which may then be accessed by any of the devices 1, for example, a broadcast decryption circuit.

Figure 2:
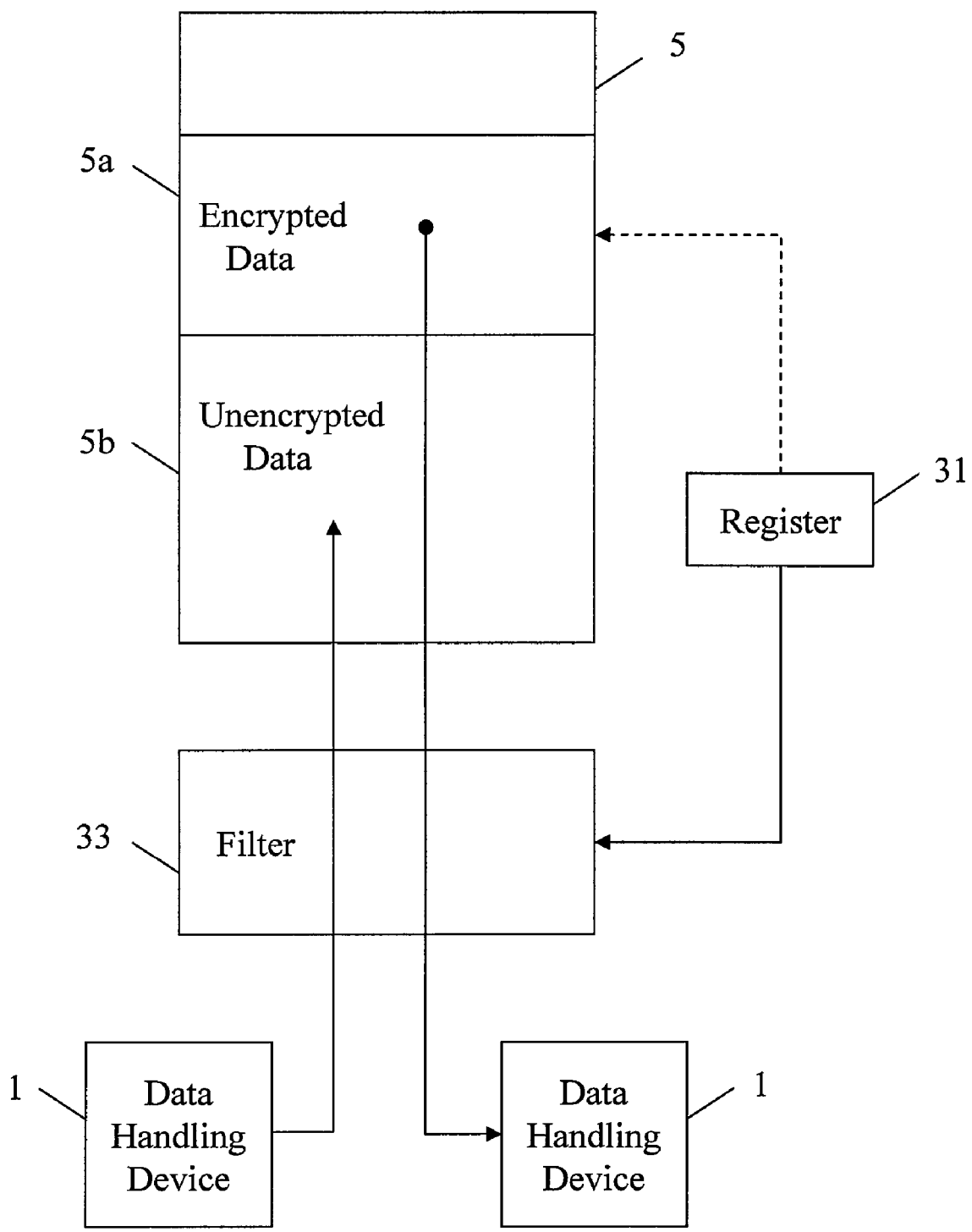
FIG. 2 is a schematic diagram of a data filter arrangement used with the system of FIG. 1.

In a further embodiment of the invention, the external memory 5 is separated into different regions, some for storing privileged data in encrypted form, and others for storing unprivileged data in an unencrypted form. In a simple example illustrated in FIG. 2 in schematic form, the external memory 5 is separated into two regions, one for storing encrypted data 5a, and the other for storing unencrypted data 5b. A register 31 is provided which stores data allowing the different regions of the external memory 5 to be distinguished. For example, in the preferred embodiment, the register 31 stores the start and end memory addresses of those regions of the external memory 5 which store privileged data. The contents of the register 31 may be modified, for example by a processor or other secure device to redefine the regions of the external memory 5.

When data is transferred between a device 1 and the external memory 5, the data transfer may be blocked according to the identity of the device 1 transferring the data, and also to the location to or from which data is being transferred. For example, if a device 1 which is secure attempts to write data to an unprivileged region of the external memory 5 then the data transfer is blocked. If a device 1 which is insecure attempts to read data from a privileged region of the external memory 5, then again, the data transfer is blocked.

A filter 33 is provided to selectively block data access to or from the external memory 5, and is arranged so that the data routes which connect the devices 1 to the external memory 5 all pass through the filter 33. When a data access is attempted, the memory address of the data being accessed is determined and compared by the filter 33 with the contents of the register 31 to determine whether the memory address falls within a privileged region of the external memory 5. The filter 33 also receives the identification of the device 1 which made the data access request, and then allows or blocks the data access according to a set of rules which depend on the comparison and the device identification. In the preferred embodiment, the rules are hard wired in the filter so that the rules cannot be modified.

Data accesses from secure devices can only involve the privileged regions of the external memory 5, since other data accesses are blocked by the filter. Conversely, data accesses from insecure devices only involve the unprivileged regions of the external memory 5. The regions of the external memory 5 are defined so that the privileged and unprivileged regions are mutually exclusive. It can be seen that it is not possible to transfer privileged data between a secure device and an insecure device via the external memory 5 since those devices can only access mutually exclusive regions of memory. In this way, even if the encryption scheme of the system is broken by a hacker, it would still be difficult for the hacker to access privileged data by transferring the data from a secure to an insecure device.

The invention claimed is:

1. A monolithic semiconductor integrated circuit for selectively encrypting or decrypting data, comprising:
   a plurality of devices each having a unique identifier;
   a cryptographic circuit arranged to encrypt or decrypt data;
   a plurality of selectable data routes formed from a plurality of data pathways, along which data may flow between the devices and an external memory, wherein at least one data route passes through the cryptographic circuit and at least one data route does not pass through the cryptographic circuit; and
   a control arranged to receive the unique identifier of a selected one of the devices transferring data, and to select one of the at least one data route that passes through the cryptographic circuit, or one of the at least one data route that does not pass through the cryptographic circuit, according to the unique identifier of the selected device.

2. A semiconductor integrated circuit according to claim 1 wherein the control is further arranged to select a route that passes through the cryptographic circuit if the control determines that the device transferring data is secure.

3. A semiconductor integrated circuit according to claim 1 wherein the control is further arranged to select a route that does not pass through the cryptographic circuit if the control determines that the device transferring data is insecure.

4. A semiconductor integrated circuit according to claim 3 wherein the control is arranged to use the unique identifier to determine that the selected device is secure or insecure.

5. A semiconductor integrated circuit according to claim 4 wherein the control is further arranged to use the unique identifier as an index to a look-up table containing an indication of which of the devices are secure or insecure.

6. A semiconductor integrated circuit according to claim 1 wherein the plurality of devices includes at least one of, a cryptographic processor, direct memory access unit, central processing unit, moving picture experts group decoder, read only memory, programmable transport interface, universal serial bus interface, or broadcast receiver.

7. A semiconductor integrated circuit according to claim 1 wherein the data includes video data, audio data, encryption keys, or data broadcast over air.

8. A semiconductor integrated circuit according to claim 1, wherein the control is further arranged to cause the cryptographic circuit to encrypt data transmitted from a first device of the devices to the external memory only if the first device is secure, and to cause the cryptographic circuit to decrypt data from the external memory to a second device of the devices only if the second device is secure.

9. A semiconductor integrated circuit according to claim 1 wherein the external memory is separated into a plurality of mutually exclusive regions, and the circuit further comprises:
   a register for storing data for distinguishing the regions of the external memory; and
   a filter through which the data routes connecting the devices and the external memory pass, arranged to selectively block a data access to or from the external memory according to the unique identifier of a device, of the devices, requesting the data access, and according to which region of the external memory is being accessed.

10. A semiconductor integrated circuit according to claim 9 wherein some of the regions of the external memory store privileged data, and the other regions of the external memory store unprivileged data.

11. A semiconductor integrated circuit according to claim 9 wherein the register is arranged to store start and end memory addresses of each region of the external memory.

12. A semiconductor integrated circuit according to claim 11 wherein the filter is arranged to compare a memory address of data being accessed with contents of the register to determine which region of the external memory is being accessed.

13. A semiconductor integrated circuit according to claim 12 wherein the filter is arranged to selectively block data accesses requested by secure devices to unprivileged regions of data.

14. A semiconductor integrated circuit according to claim 12 wherein the filter is arranged to selectively block data accesses requested by insecure devices to privileged regions of data.

15. A semiconductor integrated circuit according to claim 1 wherein the semiconductor integrated circuit is a television decoder.

16. A method, comprising:
   transmitting data between one of a plurality of devices, the devices each having a unique identifier, and an external memory, the data being transmitted along one of a plurality of selectable data routes formed from a plurality of data pathways, wherein at least one data route passes through a cryptographic circuit and at least one data route does not pass through the cryptographic circuit; and
   selectively encrypting or decrypting the transmitted data, the selectively encrypting or decrypting including:
      receiving the identification of a selected one of the devices; and
      selecting a data route of the at least one data route that passes through the cryptographic circuit, or one of the at least one data route that does not pass through the cryptographic circuit, according to the unique identifier of the selected device.

17. The method according to claim 16 further comprising the steps of determining that the device transferring data is secure, and selecting a data route that passes through the cryptographic circuit if the device is secure.

18. The method according to claim 16 further comprising the steps of determining that the device transferring data is insecure, and selecting a data route that does not pass through the cryptographic circuit if the device is insecure.

19. The method according to claim 18 further comprising the step of using the unique identifier to determine whether the selected device is secure or insecure.

20. The method according to claim 19 further comprising the step of using the unique identifier as an index to a look-up table containing an indication of which of the devices are secure or insecure.

21. The method according to claim 16 wherein the plurality of devices includes at least one of a crypto core, direct memory access unit, central processing unit, moving picture experts group decoder, read only memory, programmable transport interface, universal serial bus interface, or broadcast receiver.

22. The method according to claim 16 wherein the data includes video data, audio data, encryption keys, or data broadcast over air.

23. The method according to claim 16 further comprising the steps of:
   transmitting data from a first device of the devices to the external memory;
   encrypting the data only if the first device is secure;
   transmitting the data from the external memory to a second device of the devices; and
   decrypting the data only if the second device is secure.

24. The method according to claim 16 wherein the external memory is separated into a plurality of mutually exclusive regions, the method further comprising the steps of:
   determining which region of the external memory is being accessed;
   selectively blocking a data access to or from the external memory according to the unique identifier of a device, of the devices, requesting the data access, and according to which region of the external memory is being accessed.

25. The method according to claim 24 wherein some of the regions of the external memory store privileged data, and the other regions of the external memory store unprivileged data.

26. The method according to claim 24 wherein the step of determining which region of the external memory is being accessed comprises the step of comparing a memory address of the data being accessed with start and end memory addresses of each region of the external memory.

27. The method according to claim 26 wherein data accesses requested by secure devices to unprivileged regions of data are selectively blocked.

28. The method according to claim 26 wherein data accesses requested by insecure devices to privileged regions of data are selectively blocked.

29. A system, comprising:

an external memory; and a monolithic semiconductor integrated circuit for selectively encrypting or decrypting data, the semiconductor integrated circuit including:

a plurality of devices each having a unique identifier;

a cryptographic circuit arranged to encrypt or decrypt data;

a plurality of selectable data routes formed from a plurality of data pathways, along which data may flow between the devices and the external memory, wherein at least one data route passes through the cryptographic circuit and at least one data route does not pass through the cryptographic circuit; and a control arranged to receive the unique identifier of a selected one of the devices transferring data, and to select one of the at least one data route that passes through the cryptographic circuit, or one of the at least one data route that does not pass through the cryptographic circuit, according to the unique identifier of the selected device.

30. A system according to claim 29 wherein the control is further arranged to select a route that passes through the cryptographic circuit if the control determines that the device transferring data is secure.

31. A system according to claim 29 wherein the control is further arranged to select a route that does not pass through the cryptographic circuit if the control determines that the device transferring data is insecure.

32. A system according to claim 29 wherein the control is further arranged to use the unique identifier as an index to a look-up table containing an indication of which of the devices are secure or insecure.

33. A system according to claim 29, wherein the control is further arranged to cause the cryptographic circuit to decrypt data from the external memory to one of the devices only if the one of the devices is secure.

34. A system according to claim 29 wherein the external memory is separated into a plurality of mutually exclusive regions, and the circuit further comprises:

a register for storing data for distinguishing the regions of the external memory; and a filter through which the data routes connecting the devices and the external memory pass, arranged to selectively block a data access to or from the external memory according to the unique identifier of a device, of the devices, requesting the data access, and according to which region of the external memory is being accessed.

35. A system according to claim 34 wherein the filter is arranged to selectively block data accesses requested by secure devices to unprivileged regions of data.

36. A system according to claim 34 wherein the filter is arranged to selectively block data accesses requested by insecure devices to privileged regions of data.

* * * * *